United States Patent [19]
Ballentine

[11] 3,797,865
[45] Mar. 19, 1974

[54] ADAPTER
[75] Inventor: Willard Ballentine, Flint, Mich.
[73] Assignee: Palmer Concrete Products, Inc., Flint, Mich.
[22] Filed: Feb. 25, 1971
[21] Appl. No.: 118,726

[52] U.S. Cl.................. 285/175, 138/119, 285/237, 285/260, 285/DIG. 4
[51] Int. Cl............................................. F16l 21/00
[58] Field of Search...... 138/119; 285/40, 175, 177, 285/223, 235, 237, 260, 328, 390, 391, 399, 417, 397, 423, DIG. 4

[56] References Cited
UNITED STATES PATENTS

| 481,026 | 8/1892 | Hart | 285/397 |
|---|---|---|---|
| 2,366,067 | 12/1944 | Smith | 285/260 X |
| 2,890,899 | 6/1959 | Simmons et al. | 285/235 X |
| 3,076,669 | 2/1963 | Schlein | 285/423 X |
| 2,818,281 | 12/1957 | Kurti | 285/399 |
| 2,871,034 | 1/1959 | Wiltse | 285/235 X |
| 3,212,799 | 10/1965 | Rice | 285/235 |

FOREIGN PATENTS OR APPLICATIONS

| 111,934 | 10/1968 | Denmark | 285/237 |
|---|---|---|---|
| 247,679 | 6/1966 | Austria | 285/417 |
| 1,391,946 | 2/1965 | France | 285/390 |

*Primary Examiner*—Mervin Stein
*Assistant Examiner*—David H. Corbin
*Attorney, Agent, or Firm*—Weiner, Basile and Weintraub

[57] ABSTRACT

An adapter for connecting a threaded conduit to a smooth-walled conduit. The adapter includes a first body portion having a righthanded screw thread for securement to a threaded conduit. A second body portion having a pair of diametrically opposed concave land sections and a lefthanded acute angled chamfered screw thread is adapted to be inserted within the interior of the smooth-walled conduit. The acute angled chamfered thread hinders axial separation of the adapter from the smooth-walled conduit.

10 Claims, 8 Drawing Figures

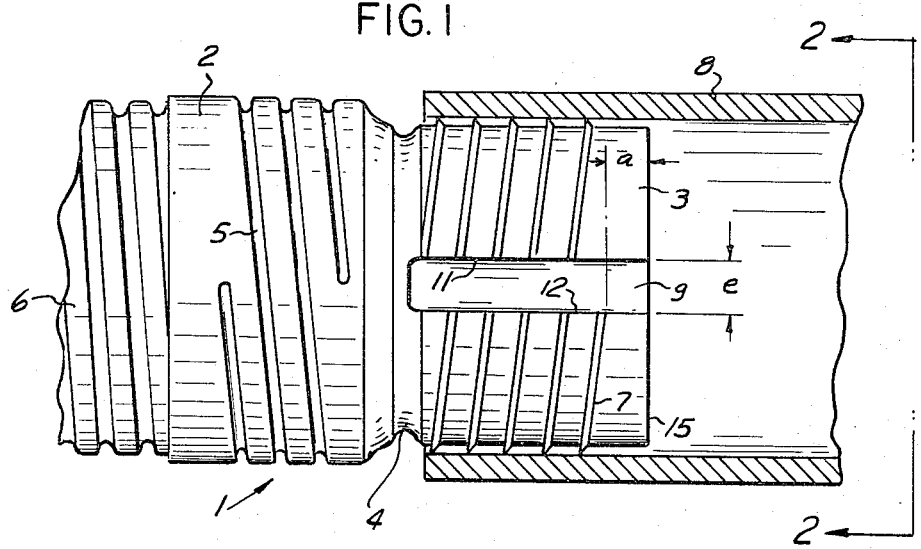
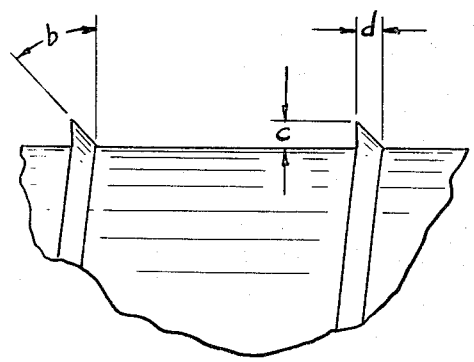
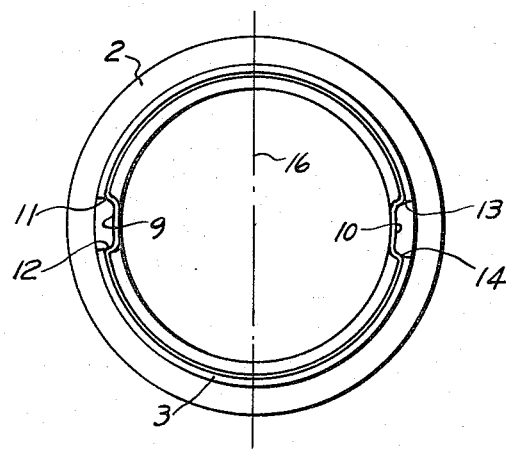
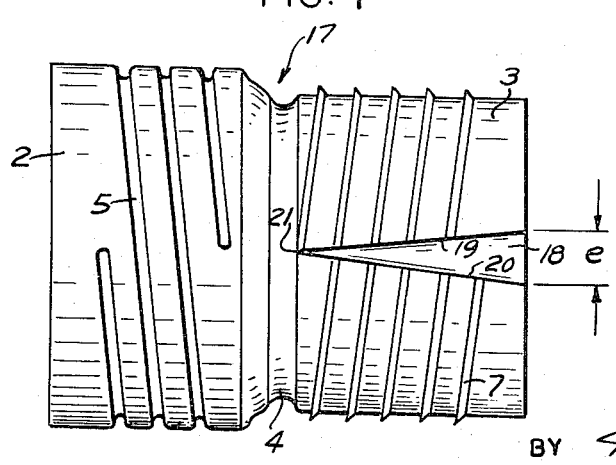

INVENTOR
WILLARD BALLENTINE
ATTORNEY

ADAPTER

The present invention relates to an adapter for connecting together two conduits. More particularly, the present invention relates to an adapter for connecting a first conduit having a first diameter to a second conduit having a second diameter which is of a dimension that is different than the dimension of the first diameter, and also to an adapter for connecting a first conduit having a threaded surface to a second conduit having a smooth-walled interior surface.

BACKGROUND OF THE INVENTION

Prior to the present invention, there had been various attempts to provide an adapter or coupling which was capable of connecting together conduits of different diameters and/or a conduit having a threaded surface to a conduit having a smooth inside wall. None of the prior art devices have proved successful.

The need for a secure, inexpensive and readily connectable adapter or coupling is particularly significant in association with plastic pipe utilized for drainage purposes. For this and other applications it is necessary to have an adapter for connecting a corrugated or threaded plastic conduit to a smooth-walled conduit. The prior art adapters have had a salient drawback or disadvantage of being separable from the smooth-walled conduit when exposed to axial separating forces. In addition, many of the prior art adapter have required longitudinal slits in a portion of the adapter, or flexible sleeve members. The present invention has overcome the disadvantages of the prior art adapters, and in addition has provided an adapter which is extraordinarily strong and resists separation from the conduit to which it is readily affixed.

SUMMARY OF THE INVENTION

The present invention provides an adapter for connecting a first conduit to a second conduit. The adapter includes a first body portion which has a substantially tubular shape and which has first means for securing the first body portion to the first conduit. The adapter also includes a second body portion which has a substantially tubular shape and which has second means for securing the second body portion to a second conduit. The first body portion is integrally connected to and coaxially disposed with the second body portion. The adapter is provided with at least one pair of diametrically opposed concave land sections which are formed within the exterior surface of the first body portion and/or within the exterior surface of the second body portion and which are adapted for facilitating the securement of the first body portion and/or of the second body portion to the first conduit and/or to the second conduit.

An important aspect of the present invention resides in the provision of a special acute angled chamfered thread on the exterior surface of one portion of the adapter. This acute angled thread has a profile approximating a right triangle with one of the legs of the right triangle being disposed substantially perpendicular to the longitudinal axis of the adapter and remote from the open end of that portion of the adapter. This special thread facilitates the insertion of its associated portion of the adapter within the interior of a smooth-walled conduit. This same special thread resists translatory separation of the adapter from the smooth-walled conduit.

Another feature of the present invention resides in the provision of a pair of diametrically opposed land sections on at least one portion of the adapter, which land portions may be used for compressing the flexible adapter for insertion within a conduit to be connected. Release of manual or other pressure from these land sections after insertion within the desired conduit permits the adapter to expand into an intimate and rigid connection with that conduit. These same land sections assist in the rotation of the adapter.

In a preferred embodiment of the invention, the adapter is provided with portions which have threaded exteriors wherein the threads run in opposite directions. For example, a first portion of the adapter may be provided with a double right-handed thread, whereas a second portion of the adapter may be provided with a double lefthand thread. If desired, at least one of these threads may be of the type described above having the acute angled chamfered profile.

BRIEF DESCRIPTION OF THE DRAWINGS

FIG. 1 illustrates a side elevational view, partly in section, of a first embodiment of the adapter of the present invention interconnecting a thin-walled threaded plastic pipe with a smooth-walled conduit.

FIG. 2 depicts an end elevational view of the first embodiment of the adapter shown in FIG. 1 taken along the line 2—2 and omitting the thin-walled threaded plastic pipe and the smooth-walled conduit.

FIG. 3 is an enlarged view of the double lefthanded thread shown in FIG. 1 and in other embodiments of the invention, which thread has an acute angled chamfered profile substantially in the shape of a right triangle.

FIG. 4 illustrates a side elevational view of a second embodiment of the adapter of the present invention wherein the portion of the adapter having the chamfered double lefthanded thread is traversed by a pair of diametrically opposed tapered land sections.

DETAILED DESCRIPTION OF SOME PREFERRED EMBODIMENTS OF THE PRESENT INVENTION

Figure 5:
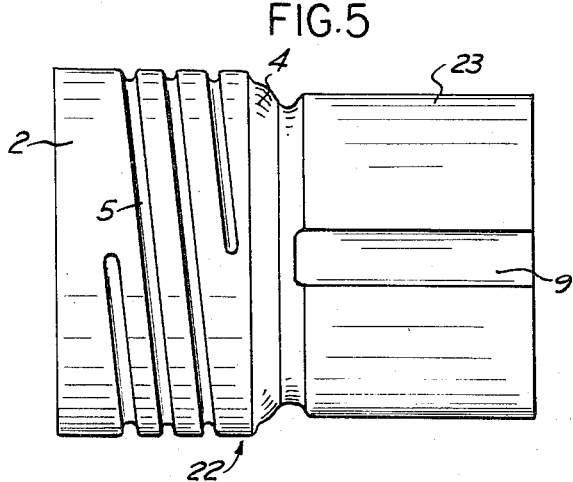
FIG. 5 depicts a side elevational view of a third embodiment of the adapter of the present invention which is similar to the FIG. 1 embodiment with the omission of the chamfered double lefthanded thread.

With reference to FIG. 1 of the drawings, there is shown a first embodiment of the adapter 1 which includes a first body portion 2, a second body portion 3, coaxially disposed with the first body portion and a third body portion 4 disposed therebetween which defines means integrally connecting said body portions. The adapter 1 may be molded in a single molding operation, and is preferably made from flexible resilient material to form a thin-walled adapter. In a preferred embodiment of the invention, the adapter 1 is contemplated as being made from various plastics, such as polyvinylchloride, or other various vinyl resins, polyethylene, polypropylene, polyacetal resins, synthetic or natural rubber, acrylonitrile-butadiene-styrene resins, etc.

The first portion 2 of the adapter 1 has a substantially tubular shape and is provided with first means, such as a double righthanded thread 5, for securing the first body portion 2 to a first conduit, such as a thin-walled threaded plastic pipe 6 and, preferably, exteriorly thereof, as shown. In FIG. 1 the first body portion 2 of the adapter 1 is shown threadedly secured to the end of the plastic pipe 6. It should be noted that the thread 5 is not a single helical thread formed around the first body portion 2, but rather the thread 5 is a double righthanded thread which includes two separate helical threads which start at different portions of the first body portion 2.

The adapter 1 also includes a second body portion 3 which has a substantially tubular shape and which has second means, such as a double lefthanded thread 7, for securing the second body portion 3 to a second conduit, such as a smooth-walled conduit 8. The double lefthanded thread 7 has a special acute angled chamfered thread profile which is described hereinbelow in greater detail in connection with FIG. 3. The novel and special thread 7 permits the second body portion 3 to be readily inserted within the interior of the conduit 8, whereby the double lefthanded thread engages the interior surface of the second conduit 8, and at the same time impedes or prevents an axial translatory separation of the second body portion 3 from the conduit 8.

The adapter 1 also includes a third body portion 4 disposed between the first and second body portions 2 and 3 and is integrally connected to the first and second body portions 2 and 3. The third body portion 4 includes a portion having the smallest diameter of the adapter 1. Essentially, the third body portion 4 is a transition section between the first body portion 2 having a first diameter and the second body portion 3 having a second diameter different from the diameter of the first body portion.

With reference to FIGS. 1 and 2, it will be seen that the second body portion 3 is provided with a pair of diametrically opposed concave land sections 9 and 10 which are formed within the exterior surface of the second body portion 3 the land sections interrupt the securing means formed thereon, and these concave land sections 9 and 10 are adapted for facilitating the securement of the second body portion 3 to the smooth-walled conduit 8. In the first embodiment of the present invention shown in FIG. 1, the pair of diametrically opposed concave land sections 9 and 10 are disposed parallel to the longitudinal axis of the adapter 1 and traverse substantially the entire axial length of the second body portion 3 and terminate a short distance into the third body portion 4. The land section 9 is provided with a base portion and two side portions having substantially parallel edges 11 and 12, and a land section 10 is similarly provided with parallel edges 13 and 14. Each side portion extends radially inwardly from longitudinal edge lines 11 and 12, and opposite longitudinal edge lines 13 and 14, which, respectively, lie on the exterior surface of the second body portion 3. The side portions extend to the base portion such that the concave land sections extend inwardly from the interior surface of the second body portion 3. It is thus seen that the means for securing the second body portion is disposed between adjacent longitudinal edge lines of the opposed land sections 9 and 10. The concave land sections 9 and 10 facilitate a slight radial compression of the second body portion 3 to aid insertion of the second body portion 3 within the interior of the conduit 8 wherein the release of pressure from the land section permits the thread to flex into intimate and secure contact with the interior of conduit 8. Where the second body portion 3 is provided with a thread 7, the concave land sections 9 and 10 also facilitate gripping of the adapter for the rotation to obtain thread engagement. Upon release of the pressure applied to the concave land sections 9 and 10, the second body portion 3 resiliently springs into a firm and intimate contact with the interior walls of the conduit 8. It should also be noted that the double lefthanded thread 7 does not extend to the exposed end 15 of the second body portion 3, but rather the thread 7 terminates, for example, in the longitudinal edge 12 of the concave land section 9 at a predetermined distance $a$ away from the exposed end 15 of the second body portion 3. This feature of the present invention facilitates the insertion of the second body portion 3 within the interior of the smooth-walled conduit 8 and also facilitates the commencement of the rotary threaded engagement of the second body portion 3 with the conduit 8.

With reference to FIGS. 1 and 2, it will be seen that the adapter 1 and the thin-walled threaded plastic pipe 6 may have a relatively thin wall and be of substantially the same wall thickness. In a preferred embodiment of the invention, both the adapter 1 and the thin-walled threaded plastic pipe 6 may be fabricated from the same polyethylene plastic material.

Referring to FIG. 3, there is shown an enlarged view of two adjacent thread portions of the novel acute angled chamfered double lefthanded thread 7 which is also illustrated in FIG. 1. It should be noted that the thread 7 is not a single helical thread formed around the second body portion 3, but rather the thread 7 is a double lefthanded thread including two separate helical threads which start at different portions on the periphery of the second body portion 3.

As illustrated in FIG. 3, the special thread 7 has a profile substantially in the shape of a right triangle. The chamfer angle is designated $b$ and this angle may be any acute angle suited to the environment and application of the adapter 1 formating with a conduit 8. However, in a preferred embodiment of the present invention, the chamfer angle $b$ has been made approximately equal to 45°, with the legs $c$ and $d$ forming the other legs of the triangle. The leg $d$ is disposed substantially parallel to the longitudinal axis of the second body portion 3. The other leg $c$ is disposed substantially perpendicular to the longitudinal axis of the second body portion 3 and proximal the juncture of the second and third body portions. The hypotenuse of the triangle slopes downwardly away from the first body portion and towards the longitudinal axis of the second body portion. In the aforementioned same preferred embodiment of the present invention, the legs c and d of the right triangled profile have been made equal to approximately 0.039 inches. The chamfer angle b and the dimensions c and d depend, of course, on many parameters such as the type of material from which the adapter 1 is fabricated, the type of material from which the mating inner wall of the conduit 8 is fabricated, the magnitude of the force desired to oppose translatory separation of the adapter 1 from the conduit 8, etc.

Adverting again to FIGS. 1 and 2, in a preferred embodiment of adapter 1, the width d of the pair of diametrically opposed concave land sections 9 and 10 is approximately equal to 0.6 inches. With reference to FIG. 2, it should be noted that the concave land sections 9 and 10 are disposed on opposite sides of a mold parting line 16 which is an important aspect of the present invention and greatly facilitates the molding of the novel adapter.

Before commencing the description of the remaining drawings, it should be noted that in the remaining drawings similar reference numerals refer to similar parts or elements.

FIG. 4 illustrates a second embodiment of the present invention in the form of an adapter 17 which may be similar to the adapter 1 except for the formation, placement and shape of the concave land sections. The adapter 17 also has a first body portion 2 which is integrally attached to a third body portion 4, which in turn is integrally attached to a second body portion 3. The first body portion 2 is provided with a thread 5 which is helically wound in a direction which is different than the winding direction of the thread 7 on the second body portion 3.

The adapter 17 is provided with a pair of diametrically opposed concave land sections only one of which is shown in FIG. 4 as land section 18. Land section 18 is provided with two longitudinal edges 19 and 20 which taper or converge to a vertex 21. The width e of the land section 18 of adapter 17, and also the width of the diametrically opposed land sections 9 and 10 of adapter 1, is approximately 0.787 inches in preferred embodiments of the present invention.

With reference to FIG. 5, there is shown an adapter 22 according to a third embodiment of the present invention. The adapter 22 is similar to the adapter 1 illustrated in FIGS. 1, 2 and 3 with the exception of the acute angled chamfered thread 7. The adapter 22 comprises a first body portion 2 which is integrally connected to a third body portion 4, which in turn is integrally connected to a tubular smooth surfaced second body portion 23. The first body portion has a double right handed thread 5 capable of threadedly securing the adapter 22 over the exterior thread surface of a plastic pipe 6.

The tubular second portion 23 of the adapter 22 is substantially cylindrical in shape except for a pair of diametrically opposed concave land sections similar to land sections 9 and 10 of FIGS. 1 and 2. Only the land section 9 is shown in FIG. 5. The adapter 22 is particularly suited to facilitate the insertion of the smooth exteriored second body portion 23 within the interior of a conduit 8 especially where a thread might not be easily engaged with the interior surface of a conduit 8. It should be noted that the pressure of the diametrically opposed concave land sections on the second body portion 23 will enable the second body portion 23 to be axially translated into the interior of the conduit 8 without the necessity of any rotation for said engagement. Upon release of the manual or other pressure from the diametrically opposed land sections, the second body portion 23 will flex into intimate and secure contact with the interior portion of conduit 8.

Figure 6:
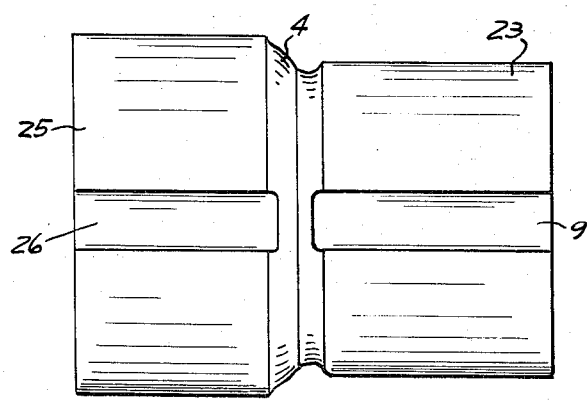
FIG. 6 illustrates a side elevational view of a fourth embodiment of the adapter to the present invention wherein both the right and left portions of the adapter are each provided with a pair of diametrically opposed concave parallel-edged land sections with the omission of any threaded portions.

Referring to FIG. 6, there is illustrated an adapter 24 which requires no rotation in order to be inserted into a pipe 6 or a conduit 8. The adapter 24 is provided with a smooth exteriored substantially cylindrical first body portion 25 having a pair of diametrically opposed concave land sections. Only one of the land sections, viz., land section 26 is shown in FIG. 6. The cylindrical first body portion 25 is integrally connected to a third body portion 4, which in turn is integrally connected to a second body portion 23. The second body portion 23 and the third body portion 4 are similar to the like-referenced portions of the FIG. 5 embodiment.

It should be noted that the adapter 24 is somewhat different than the other embodiments of the invention which have been described hereinabove. In particular, both the first body portion 25 and the second body portion 23 are adapted to be inserted into the interior of the conduits or pipes with which they are intended to mate. The embodiments of the invention described in connection with FIGS. 1, 2, 3, 4 and 5 have, in contrast, related to a first body portion 2 generally intended for securement over a plastic pipe 6. On the other hand, the first body portion 25 of the adapter 24 is designed to be manually compressed by applying pressure to the diametrically opposed land sections, the first body portion 25 to be inserted within the interior of the pipe 6, and then released into flexed intimate contact with the interior surface of pipe 6.

Figure 7:
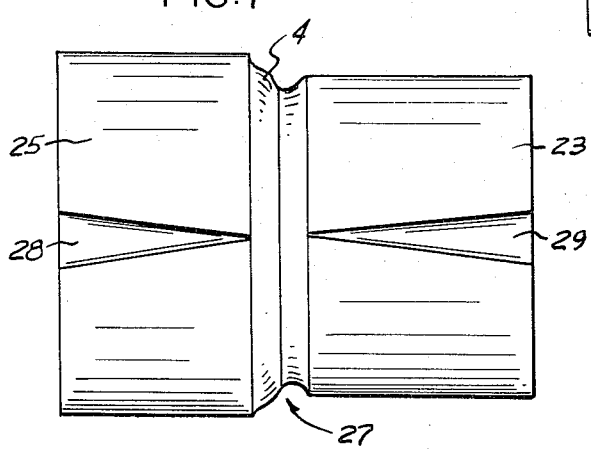
FIG. 7 illustrates a side elevational view of a fifth embodiment of the adapter to the present invention which is similar to the embodiment shown in FIG. 6 with the exception of two pairs of diametrically opposed concave tapered-edged land sections.

FIG. 7 illustrates an adapter 27 according to a fifth embodiment of the present invention. Adapter 27 is similar to the previously-described adapter 24, with the exception of tapered land sections in the adapter 27. The first body portion 25 of the adapter 27 is provided with a pair of diametrically opposed concave land sections, only one of which is illustrated in the figure, viz., land section 28. Similarly, the cylindrical body portion 23 is provided with a pair of diametrically opposed concave land sections, only one of which is illustrated in the figure, viz., land section 29. Here again both the first body portion 25 and the second body portion 23 may be inserted within the interiors of pipes or conduits desired to be connected, and when manual pressure is released from the concave land sections, the adapter springs into intimate contact with the interior surface of the pipe or conduit to be connected.

Figure 8:
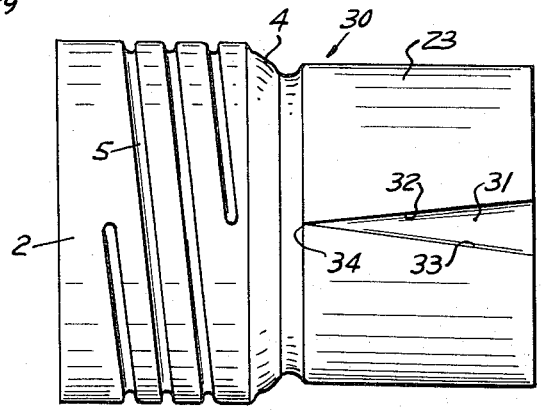
FIG. 8 illustrates a side elevational view of a sixth embodiment of the adapter to the present invention similar to the embodiment shown in FIG. 5 with the substitution of a tapered-edged pair of land sections.

With reference to FIG. 8, there is shown a side elevational view of an adapter 30 according to a sixth embodiment of the present invention which is similar to the adapter 22 illustrated in FIG. 5 with the substitution of a pair of taper-edged land sections. In particular, the adapter 30 is provided with a first body portion 2 having a double right-handed thread 5 formed in the surface thereof. The first body portion 2 is integrally connected in a single molding process to a third body portion 4, which in turn is integrally connected in a single molding process to a smooth-surfaced second body portion 23. The second body portion 23 is substantially cylindrical in shape except for a pair of diametrically opposed concave land sections, only one of which is shown in FIG. 8 as land section 31.

Each of the tapered concave land sections of adapter 30 has longitudinal tapered edges 32 and 33 which converge to a vertex 34 as illustrated in FIG. 8.

An important advantage of the invention over tapered-shaped adapters is that the configuration of the present invention results in contact with the conduit to be connected over the full length of the complete adapter, whereas tapered-shaped adapters result in, at best, a circumferential contact as only one point along the length of the tapered-shaped adapter.

It should be noted in connection with all of the above-described embodiments of the present invention with respect to the thread 5 of the first body portion 2 that the present invention contemplates a thread 5 which may permit the adapter to be threadedly disposed about the exterior surface of a pipe 6, as well as threadedly engaged in the interior of a pipe 6 depending upon the relative dimensions involved. The first body portion 2 with its attendant thread 5 is designed to threadedly fit over or within a plastic drain pipe 6 provided, for example, with a raised dot water-orifice pattern.

The present invention also contemplates that the aforementioned thread 5 and/or 7 may have any desired orientation, direction or shape depending on the application for which the adapter is intended. In those embodiments of the present invention where both threads 5 and 7 are provided, the thread directions should preferably be opposite to one another, but need not necessarily be the right and lefthanded configurations specifically illustrated in the drawings. Moreover, those embodiments of the present invention where only one portion of the adapter is provided with thread is not limited to the specific thread direction or configuration shown in the appended drawings.

I claim:

1. An adapter formed from a flexible resilient material for connecting a first conduit to a second conduit, said adapter comprising, in combination:
    a first body portion which has a substantially tubular shape and which has first means for securing said first body portion to said first conduit;
    a second body portion integral with the first body portion and which has a substantially tubular shape and which has second means for securing said second body portion to said second conduit;
    said first body portion being coaxially disposed with said second body portion;
    means integrally interconnecting said body portions;
    said first portion having a first diameter;
    said second body portion having a second diameter different from the diameter of the first body portion;
    one of said body portions being adapted to be secured to one of said conduits exteriorly thereof;
    the other of said body portions being adapted to be secured to the other of said conduits interiorly thereof; and
    a pair of diametrically opposed concave land sections formed within the exterior surface of at least one of said portion portions and which are adapted for facilitating said securing of one of said body portions to one of said conduits;
    each concave land section extending parallel to the longitudinal axis of said one of said body portions for substantially the entire length thereof;
    each said concave land section having a base portion and two side portions, each side portion extending radially inward from a longitudinal edge line which lies on the exterior surface of the substantially tubular shaped main portion of said one of said body portions to said base portion whereby the said concave land section extends inwardly from the interior surface of the substantially tubular shaped main portion of said one of said body portions;
    the means for securing said one of said body portions being disposed between adjacent longitudinal edge lines of the opposed land sections, said land sections facilitating radial compression of said one of said body portions to aid insertion thereof within the interior of said one of said conduits, and wherein the release of pressure from the land sections permits the means for securing said one of said body portions to flex into intimate and secure contact with the interior of said one of said conduits.

2. An adapter characterized substantially in accordance with claim 1, wherein:
    said first means for securing said first body portion to said first conduit includes a double right-handed thread for threadingly securing said first body portion over and around the exterior surface of said first conduit;
    said second means for securing said second body portion to said second conduit includes a double left-handed thread that has an acute angled chamfered thread profile for threadingly securing said second body portion to said second conduit within the interior thereof, said double left-handed thread engaging the interior surface of said second conduit;
    said double left-handed thread with its acute angled chamfered thread profile being adapted to impede and oppose forces tending to urge a linear translatory separation of said second body portion from said second conduit;
    said pair of diametrically opposed concave land sections are formed within the exterior surface of said second body portion and are adapted for facilitating said securing of said second body portion to said second conduit;
    said edge lines are disposed substantially parallel to each other.

3. An adapter characterized substantially in accordance with claim 1, wherein:
    each said concave land section lies within the substantially tubular shaped main portion of said second body portion and wherein the two edge lines of each land section form an acute angle having its vertex facing toward said first body portion.

4. An adapter characterized substantially in accordance with claim 1, wherein:
    each said concave land section lies within the substantially tubular shaped main portion of said second body portion and wherein the two edge lines of each land section are substantially parallel to each other.

5. An adapter characterized substantially in accordance with claim 1, wherein:
    said first means for securing said first body portion to said first conduit includes at least one helical thread disposed around at least a portion of said first body portion in a predetermined direction; and
    said second means for securing said second body portion to said second conduit includes at least one helical thread disposed around at least a portion of said second body portion in a direction which is opposite to that of said predetermined direction.

6. An adapter characterized substantially in accordance with claim 1, wherein:
said pair of diametrically opposed concave land sections are formed within the exterior surface of said second body portion and facilitate compression of said second body portion to aid inserting said second body portion within the interior of said second conduit 7. An adapter characterized substantially in accordance with claim 1, wherein:
said means connecting said body portions comprises a third body portion disposed between said first and second body portions and which third body portion includes at least one section thereof having the smallest diameter of said adapter;
said second body portion is adapted to be inserted within the interior of a smooth-walled second conduit;
said second means for securing said second body portion to said second conduit including an acute angled thread commencing adjacent the juncture of said second body portion and said third body portion and terminating a predetermined distance away from the opposite end of said second body portion;
said acute angled thread having a profile substantially in the form of a right triangle with one leg of said triangle disposed substantially parallel to the longitudinal axis of said second body portion, the other leg of said triangle being disposed substantially perpendicular to said longitudinal axis of said second body portion and proximal said juncture of said second and third body portions, and the hypotenuse of said triangle sloping downwardly away from said first body portion and towards said longitudinal axis of said second body portion.

8. An adapter characterized substantially in accordance with claim 4, wherein:
said second body portion is adapted to be inserted within the interior of said second conduit; and
said second body portion has a constant and fixed diameter.

9. An adapter characterized substantially in accordance with claim 4, wherein:
said first means for securing said first body portion to said first conduit includes at least one helical thread disposed around at least a portion of said first body portion in a predetermined direction; and
said second means for securing said second body portion to said second conduit includes at least one helical thread disposed around at least a portion of said second body portion in a direction which is opposite to that of said predetermined direction.

10. An adapter characterized substantially in accordance with claim 4, wherein:
said pair of diametrically opposed concave land sections are formed within the exterior surface of said second body portion and facilitate compression of said second body portion to aid inserting said second body portion within the interior of said second conduit.

* * * * *